United States Patent
Bird et al.

[11] Patent Number: 5,390,696
[45] Date of Patent: Feb. 21, 1995

[54] PRESSURE RELIEF VALVE

[75] Inventors: Jeremy G. Bird; Brian D. Birch, both of Gloucester; Francis N. Corfield, Andoversford, all of United Kingdom

[73] Assignee: Dowty Aerospace Gloucester Limited, Gloucester, United Kingdom

[21] Appl. No.: 78,254
[22] PCT Filed: Oct. 7, 1992
[86] PCT No.: PCT/GB92/01825
 § 371 Date: Oct. 13, 1993
 § 102(e) Date: Oct. 13, 1993
[87] PCT Pub. No.: WO93/08415
 PCT Pub. Date: Apr. 29, 1993

[30] Foreign Application Priority Data

Oct. 17, 1991 [GB] United Kingdom ............... 9122070

[51] Int. Cl.6 ................................. F16F 9/34
[52] U.S. Cl. ............................... 137/494; 137/513.3
[58] Field of Search ................ 137/494, 513.3

[56] References Cited

U.S. PATENT DOCUMENTS

| 2,853,159 | 9/1958 | Kuhn | 137/513.3 X |
| 3,805,825 | 4/1974 | Lovingham | 137/513.3 X |
| 4,044,791 | 8/1977 | McKenzie | 137/513.3 X |

Primary Examiner—Robert G. Nilson
Attorney, Agent, or Firm—Young & Thompson

[57] ABSTRACT

A pressure relief valve includes a fluid flow channel (6, 19, 21) through which an initial flow of fluid passes in use, and a valve opening member (23) responsive at a predetermined fluid pressure to open the valve (13) and allow an increased fluid flow therethrough. The valve opening member (23) is located substantially centrally in the fluid flow channel (6, 19, 21) to ensure it is always exposed to the fluid flow. Part of the flow channel (21) is formed by part of the valve (13). The valve opening member (23) and flow channel (21) are elongated and parallel. A screen (13) on the valve screens the outlet end of the channel (21) from the fluid inlet port (6).

16 Claims, 2 Drawing Sheets

PRESSURE RELIEF VALVE

This invention relates to a pressure relief valve, particularly, but not exclusively, for an aircraft undercarriage damping arrangement.

An aircraft undercarriage arrangement is shown in FIG. 1 and comprises an upper leg 1 mounted at a suitable point in a wing of the aircraft, and a lower leg 2 slidably located about a lower end of the upper leg 1. The lower leg 2 is connected to a wheeled bogey by a trunnion 3. Upper leg 1 is hollow to define an upper cavity 4 whilst lower leg 5 defines a lower cavity is 5. The cavities are separated by an end wall 6 and the lower cavity is filled with a damping oil and the upper cavity filled with damping oil and nitrogen gas. The oil is allowed to flow through a valve 7 mounted in the end wall 6 to permit a controlled collapsing of the upper leg 1 into the lower leg 2, thereby absorbing the impact of landing.

In the event of a heavy landing, it is necessary for the valve 7 to open fully to "soften" the undercarriage and avoid the impact being transmitted to passengers. In the past this has been achieved by providing a valve 7 as shown in FIG. 2, with a spring-loaded orifice plate 8 which permits an initial limited flow through the orifice 9 therein, up to a predetermined pressure limit, at which the spring-loading is overcome and the plate lifts to allow an increased flow through the valve seat 8a with which the plate cooperates.

A problem with such existing valves is that the differential area of the orifice plate may be small at high operating pressures and the oil flow past it when the valve is open may prevent it from being held open in a positive manner.

According to the invention there is provided a pressure relief valve comprising a fluid flow channel through which an initial flow of fluid passes in use, and a valve opening member responsive at a predetermined fluid pressure to open the valve and allow an increased fluid flow therethrough, wherein the valve opening member is located substantially centrally in the fluid flow channel.

By locating the valve opening member substantially centrally in the fluid flow channel, said member is always exposed to the fluid flow, thereby making the valve more reliable in operation.

Preferably, the fluid flow channel is such as to reduce or eliminate any turbulent flow effects within the valve that would cause the valve opening characteristics to vary. In particular, the fluid flow channel is made long enough so that its outlet is spaced away from a fluid inlet port and associated valve member controlled by the valve opening member. Preferably, the region around the outlet end of the fluid flow channel is screened from the fluid inlet port and associated valve member. For example, the fluid flow channel may incorporate the valve member in the form of a valve seat at its inlet end which cooperates with the valve inlet so as to take all the flow through it when the valve is closed. An outer peripheral portion of the valve member may be guided within an outer housing and a screen may be provided around the outlet end of the fluid flow channel and the outer housing.

Preferably, the valve opening member is elongated in a direction substantially parallel to the axis of the fluid flow channel such that a valve opening force is exerted on it, induced by the drag of the fluid flow in the channel. This is preferable since the cross-sectional area of the valve opening member may be reduced producing a less turbulent fluid flow.

Conveniently, the valve opening member comprises a rod extending along the axis of the flow channel.

Preferably, the fluid flow channel is defined by part of the valve opening member. This is preferable because the drag generated by walls defining the fluid flow channel acts to open the valve permitting a further reduction in the cross-sectional area of the central portion of the valve opening member.

Advantageously, the fluid flow channel has substantially parallel walls to produce a substantially parallel fluid flow.

By producing a parallel fluid flow, turbulence is avoided which might produce a closing force on the valve acting in the opposite direction to the general fluid flow direction.

A specific embodiment of the invention will now be described, by way of example only, with reference to the drawings in which:

FIGS. 1 and 2, as noted above, are respectively a schematic view and an enlarged fragmentary cross-sectional view of a pressure relief valve according to the prior art;

Figure 1:
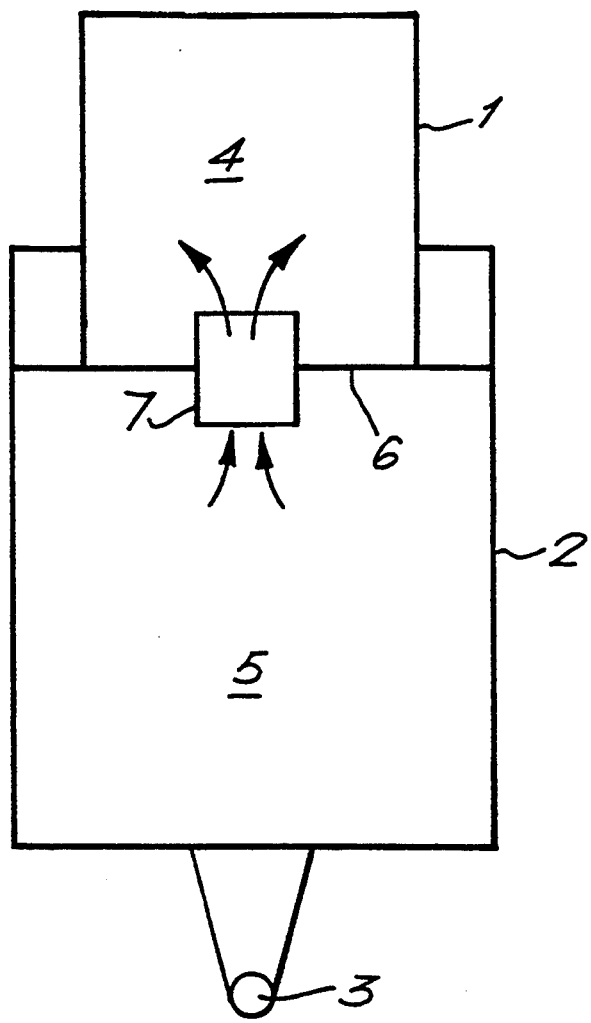
FIGS. 1 and 2 are described above.
Figure 2:
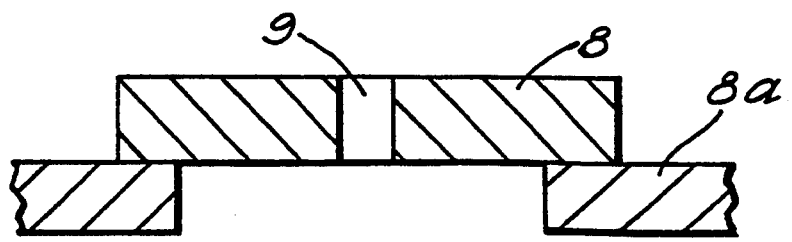
Figure 3:
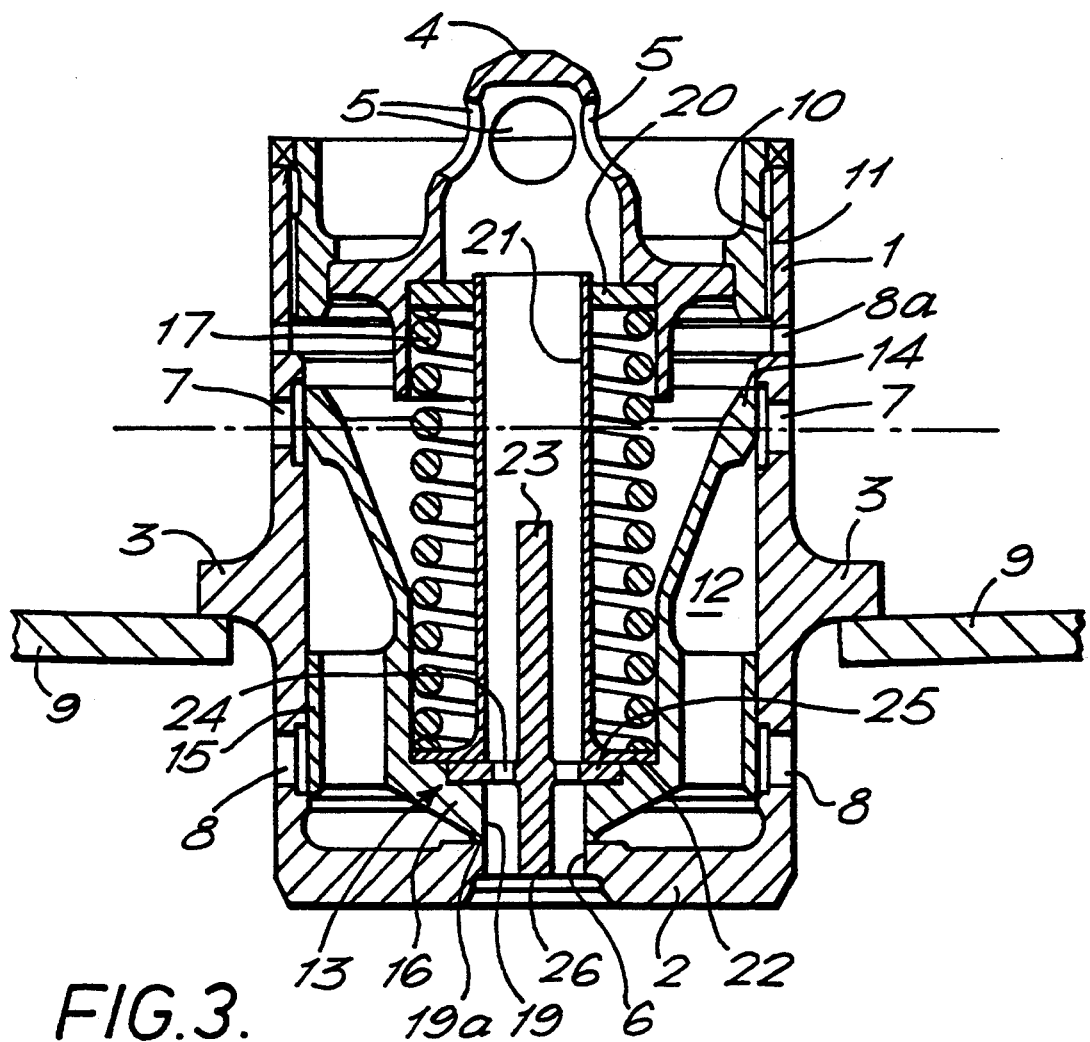
FIG. 3 shows a longitudinal section through a pressure relief valve in accordance with the invention.
Figure 4:
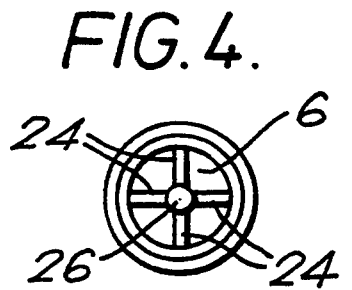
FIG. 4 shows an end view of the valve shown in FIG. 3.

With reference to FIGS. 3 and 4, a pressure relief valve comprises a generally cylindrical body 1, closed at one end by an end wall 2 and having a radially outwardly extending mounting flange 3. Bolts (not shown) pass through the flange 3 to fix the valve to an end wall 9 of an undercarriage leg which is comparable to the end wall 6 in the prior art assembly of FIG. 1. The other end of the body 1 is closed by an end cap 4 having a central upwards extension in which are formed four laterally opening fluid exit ports 5. A fluid inlet port 6 is formed centrally in the end wall 2. Pressure relief ports 7, 8 and 8a extend radially through the body 1.

An outer peripheral portion 10 of the end cap 4 is threaded for engagement with threads 11 on the internal surface of the body 1.

Located within valve cavity 12 is an axially displaceable bell-shaped, valve slide 13. The valve slide 13 has axially extending peripheral lands 14 and 15 which cooperate with the ports 7 and 8, respectively. The lower end wall 16 of the valve slide 13 makes contact with the end wall 2 of the body 1 under the action of an axially extending compression spring 17. The spring 17 acts between an inner face of the end wall 16 and a guide washer 20 loosely located in the end cap 4. A central aperture 19 is formed in the end wall 16 in alignment with, and of the same diameter as, the inlet port 6 in the body 1. A limited annular sealing area 19a of the valve slide around the aperture 19 forms a seal with the end wall 2 of the body 1.

A cylindrical flow tube 21 is located coaxially within the valve slide 13 and is connected to it via an outer collar 22 at its lower end. The upper end of the flow tube 21 projects through the aperture in the guide washer 20. The inner diameter of the flow tube 21 equals that of the apertures 6 and 19 so that they form a constant cross-section flow channel. Centrally located within the flow tube 21 is a pressure sensor 23 that is connected to the valve slide 13 by four radially extending arms 24 joined to an outer ring 25 which is received in a recess in the inner surface of the end wall 16 and clamped therein by the collar 22 of the flow tube which is connected by bolts (not shown) to the end wall 16 of the valve slide 13.

During normal landing conditions, damping oil flows from the lower leg into the upper leg of an aircraft undercarriage damping arrangement via inlet port 6 and the flow tube 21 of the pressure relief valve. The oil is guided laterally by means of the exit ports 5 in the end cap 4 to ensure turbulent mixing within the body of the oil.

In the event of a heavy landing, the fluid flow will increase. A pressure is then exerted on an end face 26 of the pressure sensor 23 and the arms 24, which together with the drag generated by the axially extending surfaces of the pressure sensor 23 and flow tube 21, opens the valve by forcing the valve slide 13 upwards against the spring 17.

The lands 14 and 15 slide back opening ports 7 and 8 and a gap opens between the valve seat 19a and the valve slide 13. Oil is then free to flow through ports 6 and 8 and on through ports 7 into the upper leg, as well as through the flow tube 21 and exit ports 5 into the upper leg. The resistance to flow experienced by the oil is thus lessened and the undercarriage enters its "softest" state. As the valve slide 13 lifts away from the end wall 2, the space between the slide 13, the flow tube 21 and the end cap 4 and washer 20 is reduced, and oil contained in this space flows outwards through the ports 8a into the upper leg.

As the landing impact is absorbed the flow rate and pressure within the damping arrangement reduces, and the valve slide 13 seats on the valve seat 19a again under the action of spring 17.

It will be appreciated that the end cap 4 and washer 20 together serve to screen the outlet end of the flow tube 21 from the space within the slide member 13, thereby preventing possible turbulence at the outlet end from having an adverse effect on the operating characteristics of the slide member. However, it may be in some applications that the flow tube 21 is long enough to distance the outlet end far enough away from the slide member that such adverse turbulence effects are of no consequence, even without these components to form a screen.

In an alternative embodiment, the flow tube may be shortened. If the screen formed by the end cap 4 and washer 20 is retained, adverse turbulence effects in the valve can still be avoided. However, the flow tube is preferably longer than its diameter and is typically longer by a factor of two or three or more.

We claim:

1. A pressure relief valve comprising inlet means defining a fluid inlet port; a valve member that is movable when a predetermined pressure level is exceeded at said inlet port, between a valve closed position in which said valve member is in engagement with the inlet means and a valve open position in which said valve member is spaced away from the inlet means, and that incorporates a channel portion defining a fluid flow channel through which an initial flow of fluid passes from the fluid inlet port when the valve member is in the valve closed position; bias means that urges the valve member to the valve closed position; and valve opening means comprising a flow sensitive member connected to the valve member and located within said flow channel to be responsive to fluid pressure at said inlet port and to fluid flow through said flow channel from said inlet port so as to urge the valve member to the valve open position.

2. A valve as claimed in claim 1 wherein the flow sensitive member is elongated in a direction substantially parallel to the axis of the fluid flow channel such that a valve opening force is exerted on it, induced by the drag of the fluid flow in the channel.

3. A valve as claimed in claim 2 wherein the flow sensitive member comprises a rod extending along the axis of the flow channel.

4. A valve as claimed in claim 1 wherein the fluid flow channel has a substantially uniform cross-section to produce a substantially uniform fluid flow.

5. An aircraft undercarriage damping system incorporating a pressure relief valve as claimed in claim 1.

6. A valve as claimed in claim 1 in which the channel portion is elongate and said fluid flow channel through it extends between the fluid inlet port and a fluid outlet port defined by outlet means.

7. A valve as claimed in claim 6 including an outer annular housing with the inlet means at one end and the outlet means at the opposite end.

8. A valve as claimed in claim 7 in which the inlet means, valve member and outlet means together define an initial fluid flow path through the housing.

9. A valve as claimed in claim 6 in which the channel portion cooperates with the outlet means.

10. A valve as claimed in claim 7 in which the valve member has an outer annular wall with a peripheral land portion which cooperates with the annular housing to define a by-pass chamber within the housing between said wall and the inlet means, the inlet port communicating with the by-pass chamber as the valve member moves from the closed to the open position.

11. A valve as claimed in claim 10 in which the housing defines an auxiliary fluid flow port with which the land portion cooperates to open said auxiliary fluid flow port as the valve member moves from the closed to the open position.

12. A valve as claimed in claim 11 in which the auxiliary fluid flow port is an outlet port from the by-pass chamber.

13. A valve as claimed in claim 12 in which the housing defines an auxiliary fluid inlet port to the by-pass chamber and the valve member has a land portion which cooperates with the housing to open said auxiliary fluid inlet port as the valve member moves from the closed to the open position.

14. A valve as claimed in claim 13 in which the auxiliary fluid inlet port is located nearer the inlet means than the auxiliary fluid outlet port.

15. A valve as claimed in claim 6 in which the bias means is located between the outlet means and the valve member.

16. A valve as claimed in claim 15 in which the bias means comprises a spring which surrounds said channel portion.

* * * * *